(12) United States Patent
Matsen et al.

(10) Patent No.: US 9,469,087 B2
(45) Date of Patent: Oct. 18, 2016

(54) THERMOPLASTIC AND TITANIUM SANDWICH STRUCTURES

(71) Applicant: The Boeing Company, Chicago, IL (US)

(72) Inventors: Marc Rollo Matsen, Seattle, WA (US); Jeffery Lee Marcoe, Bellevue, WA (US); Max U. Kismarton, Renton, WA (US); Paul Stevenson Gregg, Normandy Park, WA (US); Lee Charles Firth, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 295 days.

(21) Appl. No.: 13/937,285

(22) Filed: Jul. 9, 2013

(65) Prior Publication Data

US 2015/0017362 A1    Jan. 15, 2015

(51) Int. Cl.
| | |
|---|---|
| *B32B 15/08* | (2006.01) |
| *B29D 99/00* | (2010.01) |
| *B29C 70/44* | (2006.01) |
| *B29C 33/06* | (2006.01) |
| *B29C 35/02* | (2006.01) |
| *B32B 3/12* | (2006.01) |
| *B29L 31/30* | (2006.01) |
| *B29K 101/12* | (2006.01) |
| *B29C 35/08* | (2006.01) |

(52) U.S. Cl.
CPC .............. *B32B 15/08* (2013.01); *B29C 33/06* (2013.01); *B29C 35/0272* (2013.01); *B29C 35/0805* (2013.01); *B29C 70/446* (2013.01); *B29D 99/0014* (2013.01); *B32B 3/12* (2013.01); *B29C 2035/0811* (2013.01); *B29K 2101/12* (2013.01); *B29L 2031/3076* (2013.01); *B32B 2305/024* (2013.01); *B32B 2307/208* (2013.01); *B32B 2311/18* (2013.01); *B32B 2605/18* (2013.01); *Y10T 428/1355* (2015.01); *Y10T 428/31678* (2015.04)

(58) Field of Classification Search
CPC ..... B32B 15/08; B29C 70/446; B29C 70/00; B29C 33/06; B29C 35/0272; B29C 35/0805; B29C 65/14; B29D 99/0014
See application file for complete search history.

(56) References Cited

U.S. PATENT DOCUMENTS

| | | |
|---|---|---|
| 2,940,126 A | 6/1960 | Sheridan |
| 4,056,596 A | 11/1977 | Pahl |
| 4,946,526 A | 8/1990 | Petty-Galis et al. |

(Continued)

FOREIGN PATENT DOCUMENTS

| | | |
|---|---|---|
| EP | 0400599 A2 | 12/1990 |
| EP | 2508329 A1 | 10/2012 |

(Continued)

OTHER PUBLICATIONS

Matsen et al., "Thermoplastic Structures," U.S. Appl. No. 13/937,253, filed Jul. 9, 2013, 50 pages.

(Continued)

*Primary Examiner* — Daniel McNally
(74) *Attorney, Agent, or Firm* — Yee & Associates, P.C.

(57) ABSTRACT

A method and apparatus for forming a sandwich structure is presented. A sandwich structure comprises a metallic core layer and a thermoplastic layer on a first side of the metallic core layer. The thermoplastic layer is consolidated against the first side of the metallic core layer.

17 Claims, 8 Drawing Sheets

(56) References Cited

U.S. PATENT DOCUMENTS

| | | | |
|---|---|---|---|
| 5,019,057 A | 5/1991 | Truckai | |
| 5,587,098 A | 12/1996 | Matsen et al. | |
| 5,591,370 A | 1/1997 | Matsen et al. | |
| 5,624,594 A | 4/1997 | Matsen et al. | |
| 5,645,744 A | 7/1997 | Matsen et al. | |
| 5,683,608 A | 11/1997 | Matsen et al. | |
| 5,710,414 A * | 1/1998 | Matsen | B21D 26/021 219/633 |
| 5,728,309 A | 3/1998 | Matsen et al. | |
| 5,772,681 A * | 6/1998 | Leoni | A61M 25/005 606/192 |
| 6,039,832 A * | 3/2000 | McCarville | B32B 3/12 156/292 |
| 6,156,254 A * | 12/2000 | Andrews | A61M 25/1029 264/231 |
| 6,180,932 B1 | 1/2001 | Matsen et al. | |
| 6,528,771 B1 | 3/2003 | Matsen et al. | |
| 6,747,253 B1 * | 6/2004 | Firth | H05B 6/105 219/634 |
| 2002/0011509 A1 | 1/2002 | Nelson et al. | |
| 2003/0102070 A1 | 6/2003 | Black et al. | |
| 2004/0082965 A1 * | 4/2004 | Beckham | A61L 29/126 606/192 |
| 2004/0104512 A1 * | 6/2004 | Eidenschink | A61M 25/0009 264/295 |
| 2005/0035115 A1 * | 2/2005 | Anderson | B29C 33/04 219/759 |
| 2005/0258575 A1 | 11/2005 | Kruse et al. | |
| 2006/0289112 A1 | 12/2006 | Holman et al. | |
| 2008/0302486 A1 | 12/2008 | Jones et al. | |
| 2010/0170613 A1 | 7/2010 | Kendall et al. | |
| 2010/0269326 A1 | 10/2010 | Allehaux et al. | |
| 2012/0228467 A1 | 9/2012 | Wallen et al. | |
| 2013/0075529 A1 | 3/2013 | Marcoe | |
| 2013/0082047 A1 | 4/2013 | Matsen et al. | |

FOREIGN PATENT DOCUMENTS

| | | |
|---|---|---|
| JP | H026107 A | 1/1990 |
| JP | 2011098514 A | 5/2011 |

OTHER PUBLICATIONS

Matsen et al., "Thermoplastic Sandwich Structures," U.S. Appl. No. 13/937,269, filed Jul. 9, 2013, 65 pages.
International Search Report and Written Opinion, dated Oct. 16, 2014, regarding Application No. PCT/US2014/042467, 11 pages.
International Search Report and Written Opinion, dated Jan. 30, 2015, regarding Application No. PCT/US2014/045712, 18 pages.
Office Action, dated Apr. 15, 2015, regarding U.S. Appl. No. 13/937,253, 23 pages.
Matsen et al., "Metallic Bladders," U.S. Appl. No. 14/324,750, filed Jul. 7, 2014, 107 pages.
International Search Report and Written Opinion, dated Sep. 2, 2014, regarding Application No. PCT/US2014/042495, 7 pages.
Matsen et al., "Induction Heating Using Induction Coils in Series-Parallel Circuits," U.S. Appl. No. 13/248,134, filed Sep. 29, 2011, 25 pages.
Final Office Action, dated Nov. 13, 2015, regarding U.S. Appl. No. 13/937,269, 19 pages.
Final Office Action, dated Oct. 9, 2015, regarding U.S. Appl. No. 13/937,253, 21 pages.
Office Action, dated Jun. 25, 2015, regarding U.S. Appl. No. 13/937,269, 25 pages.
Office Action, dated Mar. 31, 2016, regarding U.S. Appl. No. 14/324,750, 36 pages.
Notice of Allowance, dated Feb. 5, 2016, regarding U.S. Appl. No. 13/937,269, 14 pages.

* cited by examiner

THERMOPLASTIC AND TITANIUM SANDWICH STRUCTURES

CROSS-REFERENCE TO RELATED APPLICATIONS

This application is related to the following patent applications: entitled "Thermoplastic Sandwich Structures," Ser. No. 13/937,269, and "Thermoplastic Structures," Ser. No. 13/937,253, filed of even date herewith, each assigned to the same assignee, and each incorporated herein by reference.

BACKGROUND INFORMATION

1. Field

The present disclosure relates generally to the formation of composite structures. More particularly, the present disclosure relates to composite sandwich structures. Yet more particularly, the present disclosure relates to a method and apparatus for forming a sandwich structure comprising thermoplastic material and titanium.

2. Background

Composite materials may be tough, light-weight materials created by combining two or more functional components. For example, a composite material may include reinforcing fibers bound in a polymer resin matrix. Resins used in composite materials may include thermoplastic or thermoset resins. A thermoplastic material may become soft upon heating and may harden upon cooling. A thermoplastic material may be able to be repeatedly heated and cooled. A thermoset material may become hard when heated. The fibers may be unidirectional or may take the form of a woven cloth or fabric.

Composite structures that include a core sandwiched between face sheets are used for many purposes. This arrangement forms a sandwich structure. Often, the core includes cells or cavities. These cells or cavities are employed to reduce the weight of the composite structure as compared to a similar structure made from solid materials. Solid materials are materials without cells. The reduced weight of these composite structures has led the aircraft industry to use such composite structures to reduce the weight of aircraft components.

The time to create a sandwich structure from thermoset materials may be undesirable. For example, thermoset materials may be laid up by hand or by machine to form the shape of the sandwich structure. The speed of laying down composite material may be limited. Further, curing a thermoset material may require several hours. In addition to holding the thermoset material at a curing temperature for several hours, conventional autoclaves using resistive heating to cure thermoset materials may further require several hours for heating up and cooling down.

Consolidating a thermoplastic material may take less time than curing thermoset material. However, the time for resistive heating during consolidation of thermoplastic material may still be undesirable.

Currently, thermoplastic sandwich structures may be produced using fasteners. The use of fasteners increases the weight of the thermoplastic sandwich structures. The use of fasteners may also increase the time to create thermoplastic sandwich structures. Accordingly there is a need for a method and assembly for producing a thermoplastic sandwich structure without the use of fasteners.

Thermoplastic sandwich structures may be only partially composed of composite materials. There is also a need for a method of consolidating thermoplastic sandwich structures which are only partially composed of composite materials. Further, there is a need to consolidate the thermoplastic sandwich structures faster than using resistive heating.

Therefore, it would be desirable to have a method and apparatus that takes into account at least some of the issues discussed above, as well as other possible issues.

SUMMARY

A sandwich structure comprises a metallic core layer and a thermoplastic layer on a first side of the metallic core layer. The thermoplastic layer is consolidated against the first side of the metallic core layer.

A sandwich structure comprises a plurality of metallic core panels joined by a plurality of thermoplastic parts and forming a metallic core layer, a first thermoplastic layer consolidated against a first side of the metallic core layer, and a second thermoplastic layer consolidated against a second side of the metallic core layer. The first thermoplastic layer comprises a closed cross-section. The first side of the metallic core layer comprises an exterior surface of the metallic core layer. The second side of the metallic core layer comprises an interior surface of the metallic core layer.

A method of forming a sandwich structure comprises placing a thermoplastic layer on a first side of a metallic core layer, placing a metallic bladder adjacent to a second side of the metallic core layer, placing the metallic core layer in a tool, and consolidating the thermoplastic layer to the metallic core layer to form the sandwich structure. Consolidating comprises pressurizing the metallic bladder such that the metallic bladder expands and imparts a compressive force to the structure.

A method of forming a sandwich structure comprises forming a metallic core layer by joining a plurality of metallic core panels using a plurality of thermoplastic parts, placing a first thermoplastic layer on a first side of the metallic core layer, placing a second thermoplastic layer on a second side of the metallic core layer, placing a metallic bladder adjacent to the second thermoplastic layer in the structure, placing a metallic bladder in each of the plurality of thermoplastic parts, placing the structure and metallic bladders into a tool, consolidating the first thermoplastic layer and the second thermoplastic layer to the metallic core layer to form the sandwich structure, removing the sandwich structure from the tool, and removing the metallic bladders from the sandwich structure. The first side of the metallic core layer comprises an exterior surface of the metallic core layer. The second side of the metallic core layer comprises an interior surface of the metallic core layer to form a structure. Consolidating comprises applying a magnetic field to a number of die liners associated with the tool, in which the number of die liners are configured to generate heat when exposed to the magnetic field, in which applying the magnetic field heats the structure to a consolidation temperature; pressurizing the metallic bladders such that the metallic bladders expand and impart a compressive force to the structure; and cooling the structure in the tool.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
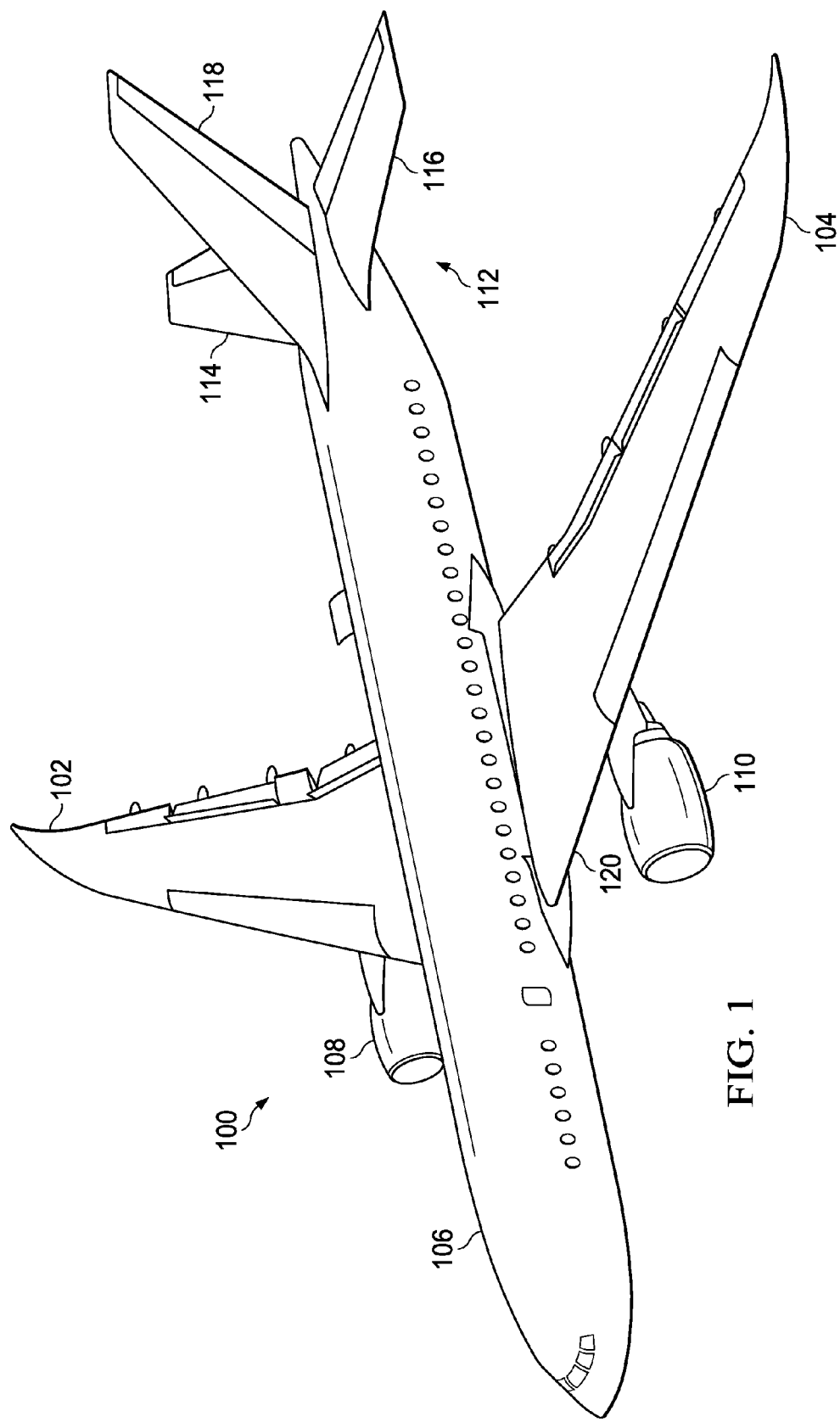
FIG. 1 is an illustration of an aircraft in accordance with an illustrative embodiment.

Aircraft are being designed and manufactured with greater and greater percentages of composite materials. Composite materials are used in aircraft to decrease the weight of the aircraft. This decreased weight improves performance features such as payload capacity and fuel efficiency. Further, composite materials provide longer service life for various components in an aircraft.

The different illustrative embodiments recognize and take into account a number of different considerations. For example, the illustrative embodiments recognize that the use of sandwich panels may allow for elimination of stringers, spars, frames, or other support structures in aircraft design.

The illustrative examples also recognize and take into account that currently implemented composite sandwich structures may be created using thermoset materials. A composite sandwich structure comprises a structure having a plurality of layers of material. In a composite sandwich structure, one or more of the plurality of layers of material may be composed of or partially composed of composite materials. A composite sandwich structure may have a group of cavities extending into the structure. The illustrative embodiments recognize and take into account that the time required to create a sandwich structure from thermoset materials may be undesirable.

For example, thermoset materials may be laid up by hand or by machine to form the shape of the sandwich structure. The illustrative embodiments recognize and take into account that the speed of laying down composite material may be limited.

Further, the illustrative embodiments recognize and take into account that curing a thermoset material may require several hours. In addition to holding the thermoset material at a curing temperature for several hours, conventional autoclaves using resistive heating to cure thermoset materials may further require several hours for heating up and cooling down.

The different illustrative embodiments recognize and take into account that consolidating a thermoplastic material may take significantly less time than curing a thermoset material. Further, the different illustrative embodiments recognize and take into account that using inductive heating may reduce the time required to consolidate a thermoplastic material or cure a thermoset material. Yet further, the different illustrative embodiments recognize and take into account that using inductive heating may reduce the energy consumed to consolidate a thermoplastic material or cure a thermoset material.

The different illustrative embodiments recognize and take into account that reducing the time to form a part may increase the number of parts produced on a tool. Further, the different illustrative embodiments recognize and take into account that reducing the energy consumed to form a part may reduce the cost of the part.

The different illustrative embodiments recognize and take into account that currently, thermoplastic sandwich structures may be produced using fasteners. The different illustrative embodiments recognize and take into account that producing a thermoplastic sandwich structure without fasteners may reduce the time required to produce a thermoplastic sandwich structure. The different illustrative embodiments recognize and take into account that producing a thermoplastic sandwich structure without fasteners may reduce the weight of a resulting thermoplastic sandwich structure.

The different illustrative embodiments also recognize and take into account that braided composites may provide improved properties over stacked layers of composite tape or tows. For example, the illustrative embodiments recognize and take into account that braided composites may provide improved out of plane loading. Braided composites may comprise fibers which cross over each other, improving the out of plane loading over stacked composite layers. As used herein, "out of plane loads" refer to loads which are not in the plane of the object. For example, loads perpendicular to the surface of a braided composite are out of plane loads. Improved out of plane loading may result in improved damage tolerance. As used herein, improved damage tolerance means improved resistance to damage resulting from impact or other sources.

The different illustrative embodiments also recognize and take into account that using braided composites may reduce composite manufacturing time. For example, the different illustrative embodiments recognize and take into account that braiding machinery may utilize a larger number of spools of composite material at once than conventional composite placement machinery. Accordingly, the different illustrative embodiments recognize that using braiding machinery may reduce manufacturing time.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which thermoplastic and titanium sandwich structures may be implemented in accordance with an illustrative embodiment. In one illustrative embodiment, torque box 120 of wing 104 may be a thermoplastic and titanium sandwich structure. Torque box 120 may be used to join wing 104 to body 106. Although torque box 120 is associated with wing 104, this is a non-limiting example. Torque boxes comprising thermoplastic and titanium sandwich structures may be used in other locations. In one illustrative example, a torque box joining two horizontal stabilizers may be a thermoplastic and titanium sandwich structure. In another illustrative example, a torque box around the perimeter of a door maybe a thermoplastic and titanium sandwich structure.

Further, thermoplastic and titanium sandwich structures are not limited to torque boxes. In another illustrative embodiment, a skin panel of wing 104 may comprise a thermoplastic and titanium sandwich structure.

The illustration of aircraft 100 in FIG. 1 is not meant to imply physical or architectural limitations to the manner in which an illustrative configuration may be implemented. For example, although aircraft 100 is a commercial aircraft, aircraft 100 may be a military aircraft, a rotorcraft, helicopter, unmanned aerial vehicle, or any other suitable aircraft.

Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a windmill, a manufacturing facility, a building, and other suitable platforms.

Figure 2:
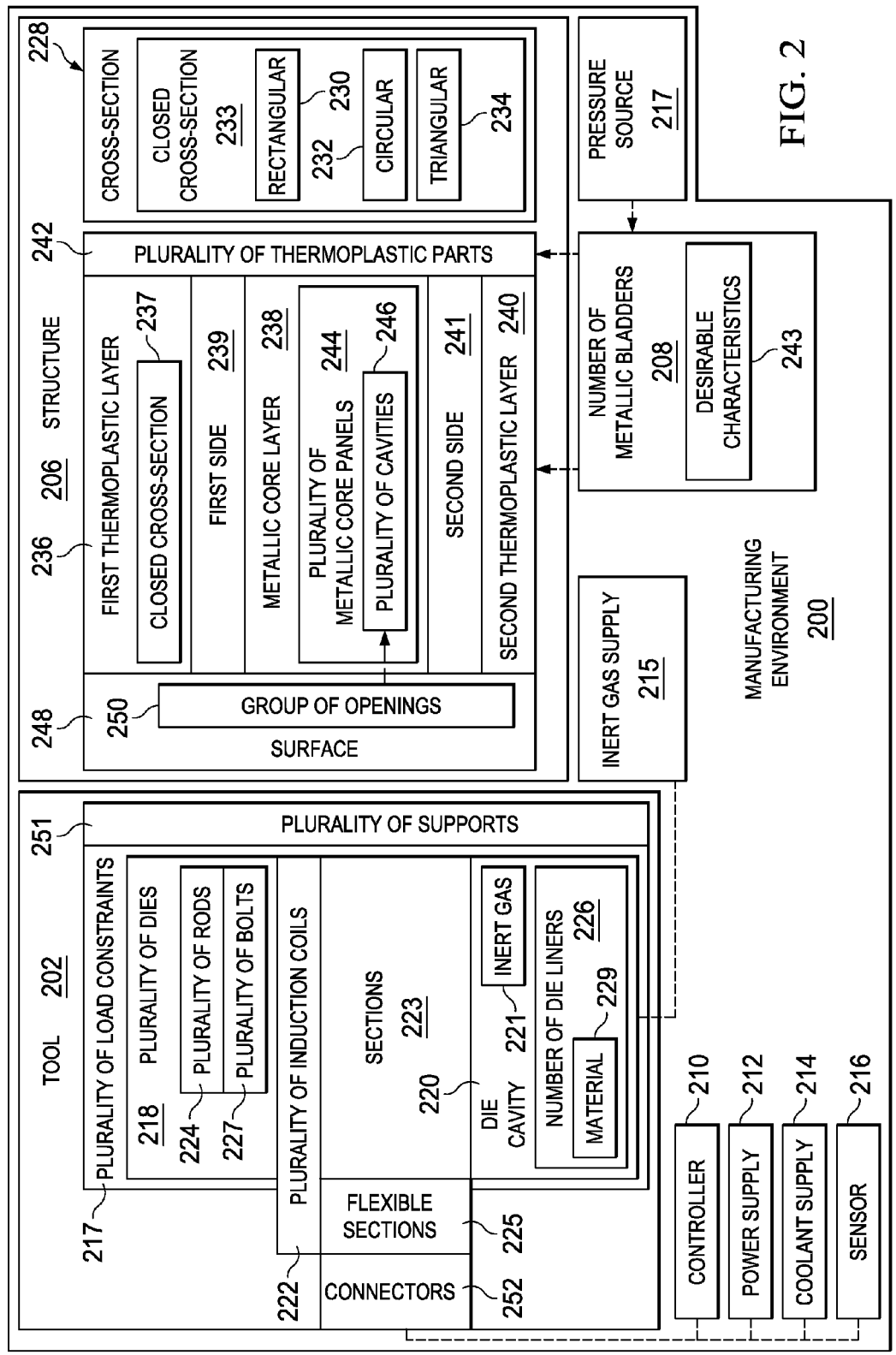
FIG. 2 is an illustration of a block diagram of a manufacturing environment in accordance with an illustrative embodiment.

With reference now to FIG. 2, an illustration of a block diagram of a manufacturing environment is depicted in accordance with an illustrative embodiment. In this illustrative example, manufacturing environment 200 in FIG. 2 is depicted in block form to illustrate different components for one or more illustrative embodiments. In this depicted example, manufacturing environment 200 includes tool 202, structure 206, number of metallic bladders 208, controller 210, power supply 212, coolant supply 214, and sensor 216.

Tool 202 is configured to consolidate structure 206. As used herein, consolidation comprises applying elevated temperature, elevated pressure, or both elevated temperature and pressure to a material such that the resin in thermoplastic material flows. As the resin in the thermoplastic material flows, the reinforcing fibers may stay in substantially the same orientation. As the resin flows it may mingle with the resin of any nearby thermoplastic materials at the boundaries of the nearby thermoplastic materials. The resin solidifies upon cooling. Consolidation may result in composite materials with a higher quality. In composite materials, higher quality may be a higher fiber volume relative to the entire volume of the composite material. Consolidation may result in composite materials with a lower void content. Tool 202 comprises plurality of load constraints 217 supported by plurality of supports 251. Tool also comprises plurality of dies 218 located within plurality of load constraints 217. Die cavity 220 may be a space created by plurality of dies 218. Die cavity 220 may be configured to contain structure 206 during a consolidation process.

Plurality of dies 218 may be formed of a material which is not susceptible to inductive heating. In some illustrative examples, plurality of dies 218 may be formed from a ceramic, a composite, a phenolic, or some other desirable material. In one illustrative example, the material for plurality of dies 218 may be selected based on a coefficient of thermal expansion, thermal shock resistance, compression strength, or a combination thereof.

In this illustrative example, the material may be selected to have a low coefficient of thermal expansion, desirable thermal shock resistance, and relatively high compression strength. In one illustrative example, plurality of dies 218 may be a castable fused silica ceramic.

As depicted, plurality of dies 218 contain plurality of induction coils 222 and plurality of rods 224. Plurality of induction coils 222 have sections 223 and flexible sections 225. Sections 223 of plurality of induction coils 222 may be embedded in plurality of dies 218. In some illustrative examples, sections 223 may extend along the length of each die in plurality of dies 218.

Flexible sections 225 of plurality of induction coils 222 may join sections 223 of different dies in plurality of dies 218. In one illustrative example, flexible sections 225 may have adequate flexibility to move as plurality of dies 218 move. In one illustrative example, flexible sections 225 may have adequate flexibility to move to connect sections 223. Plurality of induction coils 222 may be connected to controller 210, power supply 212, coolant supply 214, and sensor 216 through connectors 252 attached to flexible sections 225.

Controller 210 may be configured to control the input power fed to plurality of induction coils 222 by power supply 212. By controlling the input power, controller 210 may control the magnetic field produced by plurality of induction coils 222. By controlling the magnetic field produced by plurality of induction coils 222, controller 210 may control the operating temperature of tool 202.

Controller 210 may be implemented in software, hardware, firmware or a combination thereof. When software is used, the operations performed by controller 210 may be implemented in program code configured to run on a processor unit. When firmware is used, the operations performed by controller 210 may be implemented in program code and data and stored in persistent memory to run on a processor unit. When hardware is employed, the hardware may include circuits that operate to perform the operations in controller 210.

Coolant supply 214 may be configured to supply coolant to plurality of induction coils 222. Coolant flowing through plurality of induction coils 222 may function as a heat exchanger to transfer heat out of tool 202. Sensor 216 may be configured to measure a temperature of a portion of tool 202 during operation.

Plurality of rods 224 may be embedded within plurality of dies 218. Plurality of rods 224 may provide reinforcement for plurality of dies 218. In one illustrative example, plurality of rods 224 may be formed from fiberglass. Plurality of rods 224 may be held in place by a plurality of bolts 227. In some illustrative examples, plurality of rods 224 may extend longitudinally through a die in plurality of dies 218. In some illustrative examples, plurality of rods 224 may extend transversely through a die in plurality of dies 218. In some illustrative examples, plurality of rods 224 may extend both longitudinally and transversely through a die in plurality of dies 218.

Die cavity 220 is associated with inert gas supply 215. During consolidation of structure 206, inert gas 221 may be present in die cavity 220 from inert gas supply 215. In some illustrative examples, inert gas supply 215 may supply inert gas to pressurize metallic bladder 208.

Number of die liners 226 are configured to generate heat during consolidation of structure 206 in tool 202. Number of die liners 226 are positioned within die cavity 220. As depicted, number of die liners 226 comprise material 229. Material 229 may be a material configured to generate heat when exposed to a magnetic field. Material 229 may be selected from a metal, a metal alloy, a ceramic, a metalized film, or any other suitable material. In some illustrative examples, number of die liners 226 comprises a metallic alloy having ferromagnetic properties. In some illustrative examples, a ferromagnetic material for number of die liners 226 may be selected based on a desired consolidation temperature. For example, the material for number of die liners 226 may be selected based on a temperature at which a ferromagnetic material becomes non-magnetic. This temperature is also known as a Curie temperature. A ferromagnetic material may be selected for number of die liners 226 such that the Curie temperature for the ferromagnetic material corresponds to a desired consolidation temperature. In these illustrative examples, number of die liners 226 may also be referred to as a number of smart susceptors.

Number of die liners 226 may generate heat when exposed to a magnetic field generated by plurality of induction coils 222. Number of die liners 226 may be used to apply heat to structure 206 during the consolidation process.

Structure 206 has cross-section 228. Cross-section 228 may be closed cross-section 233. As used herein, a closed cross-section is one for which a structure forms a closed path. Accordingly, structure 206 has closed cross-section 233 when cross-section 228 of structure 206 forms a closed path. Closed cross-section 233 may be rectangular 230, circular 232, or triangular 234.

Structure 206 comprises first thermoplastic layer 236, metallic core layer 238, second thermoplastic layer 240, and plurality of thermoplastic parts 242. Structure 206 may also be referred to as a sandwich structure. Metallic core layer 238 comprises plurality of metallic core panels 244 joined by plurality of thermoplastic parts 242. Metallic core layer 238 may comprise any suitable metal or metal alloy. In one illustrative example, metallic core layer 238 comprises a titanium alloy. Plurality of metallic core panels 244 have plurality of cavities 246. Plurality of cavities 246 may extend through structure 206. Plurality of cavities 246 extending into structure 206 may be in communication with group of openings 250 in surface 248 of structure 206. Plurality of cavities 246 may have a single cross-sectional shape or a plurality of cross-sectional shapes. Metallic core layer 238 has first side 239 and second side 241. Plurality of cavities 246 may extend through structure 206 in longitudinal direction 245. In some illustrative examples, plurality of cavities 246 may extend through structure 206 in a direction substantially parallel to first side 239 and second side 241.

Plurality of thermoplastic parts 242 comprise shaped composite material. In some illustrative examples, plurality of thermoplastic parts 242 may be composite preforms. In this illustrative example, plurality of thermoplastic parts 242 may be formed to desired shapes prior to joining plurality of metallic core panels 244. In some illustrative examples, plurality of thermoplastic parts 242 may be consolidated or semi rigid prior to joining plurality of metallic core panels 244.

First thermoplastic layer 236 has closed cross-section 237. In some illustrative examples, closed cross-section 237 may have substantially the same shape as closed cross-section 233 of structure 206.

First thermoplastic layer 236 is consolidated against first side 239 of metallic core layer 238. As used herein, a material is consolidated against a surface when the material is exposed to at least one of heat and pressure so that the material flows and solidifies against the surface. Thus, the resin in first thermoplastic layer 236 flows and solidifies against first side 239 of metallic core layer 238 during consolidation. In some illustrative examples, first side 239 may be an exterior surface of metallic core layer 238.

Second thermoplastic layer 240 is consolidated against second side 241 of metallic core layer 238. The resin of second thermoplastic layer 240 flows and solidifies against second side 241 of metallic core layer 238 during consolidation. In some illustrative examples, second side 241 may be an interior surface of metallic core layer 238.

Number of metallic bladders 208 may be associated with second thermoplastic layer 240 and plurality of thermoplastic parts 242. As used herein, "a number of," when used with reference to items, means one or more items. Thus, number of metallic bladders 208 may be one or more metallic bladders.

In some illustrative examples, a metallic bladder in number of metallic bladders 208 may be placed in each thermoplastic part in plurality of thermoplastic parts 242. In one illustrative example, a metallic bladder in number of metallic bladders 208 may be placed within second thermoplastic layer 240. During consolidation, number of metallic bladders 208 may be pressurized such that number of metallic bladders 208 imparts a compressive force. In some illustrative examples, number of metallic bladders 208 may be pressurized using an inert gas. Number of metallic bladders 208 may impart a compressive force to structure 206 by expanding under pressure.

When second thermoplastic layer 240 is braided, slits of braided second thermoplastic layer 240 may move relative to each other. This movement of braided second thermoplastic layer 240 may occur when number of metallic bladders 208 expands under pressure. Movement of braided second thermoplastic layer 240 may improve the quality of resulting structure 206.

Number of metallic bladders 208 may be formed from a material exhibiting desirable characteristics 243. Desirable characteristics 243 for number of metallic bladders 208 may include the ability to hold pressure, thermal stability, flexibility, conformity, and thermal expansion characteristics. For example, it may be desirable for the material of number of metallic bladders 208 to be thermally stable at consolidation temperatures for structure 206. Additionally, it may be desirable for the material of number of metallic bladders 208 to be flexible to provide an even distribution of pressure. Further, it may be desirable for the material of number of metallic bladders 208 to be conformable to conform to ply drops or other topography of structure 206. Yet further, it may be desirable for the material of number of metallic bladders 208 to have thermal expansion characteristics to allow for removal of number of metallic bladders 208 following consolidation.

In some illustrative examples, number of metallic bladders 208 may be formed of materials having magnetic properties. In some of these illustrative examples, number of metallic bladders 208 may generate heat when exposed to a magnetic field. In some illustrative examples, number of metallic bladders 208 may be formed of a non-magnetic material.

In some illustrative examples, number of metallic bladders 208 may be formed of aluminum or an aluminum alloy. In some illustrative examples, number of metallic bladders 208 may be formed of magnesium or a magnesium alloy. In other illustrative examples, other metallic materials than aluminum or magnesium may provide desirable characteristics 243 such as an ability to hold pressure, thermal stability, flexibility, conformity, and thermal expansion characteristics.

Number of metallic bladders 208 is associated with pressure source 217. Pressure source 217 is configured to pressurize number of metallic bladders 208 during consolidation of structure 206 in tool 202.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, plurality of rods 224 may be formed of a material other than fiberglass. In this example, a plurality of reinforcing rods may be formed of a material which is preferably not electrically conductive. In another example, the plurality of reinforcing rods may be formed of an electrically conductive material and arranged such that they are not susceptible to induction heating.

As another example, instead of thermoplastic material for first thermoplastic layer 236, second thermoplastic layer 240, and plurality of thermoplastic parts 242, structure 206 may comprise a thermoset material. Although tool 202 is described above as performing a consolidating process in this illustrative example, tool 202 may be used to perform a curing process of the thermoset material. Curing a thermoset material may be performed at a lower temperature than consolidating a thermoplastic material. As a result, in these illustrative examples, number of metallic bladders 208 may comprise an elastomeric material rather than a metallic material.

As a further example, cross-section 228 may be an open cross-section or a substantially closed cross-section. For example, cross-section 228 may be a V-shape, I-shape, J-shape, Z-shape, T-shape, C-shape, a U-shape, or other suitable shape.

Figure 3:
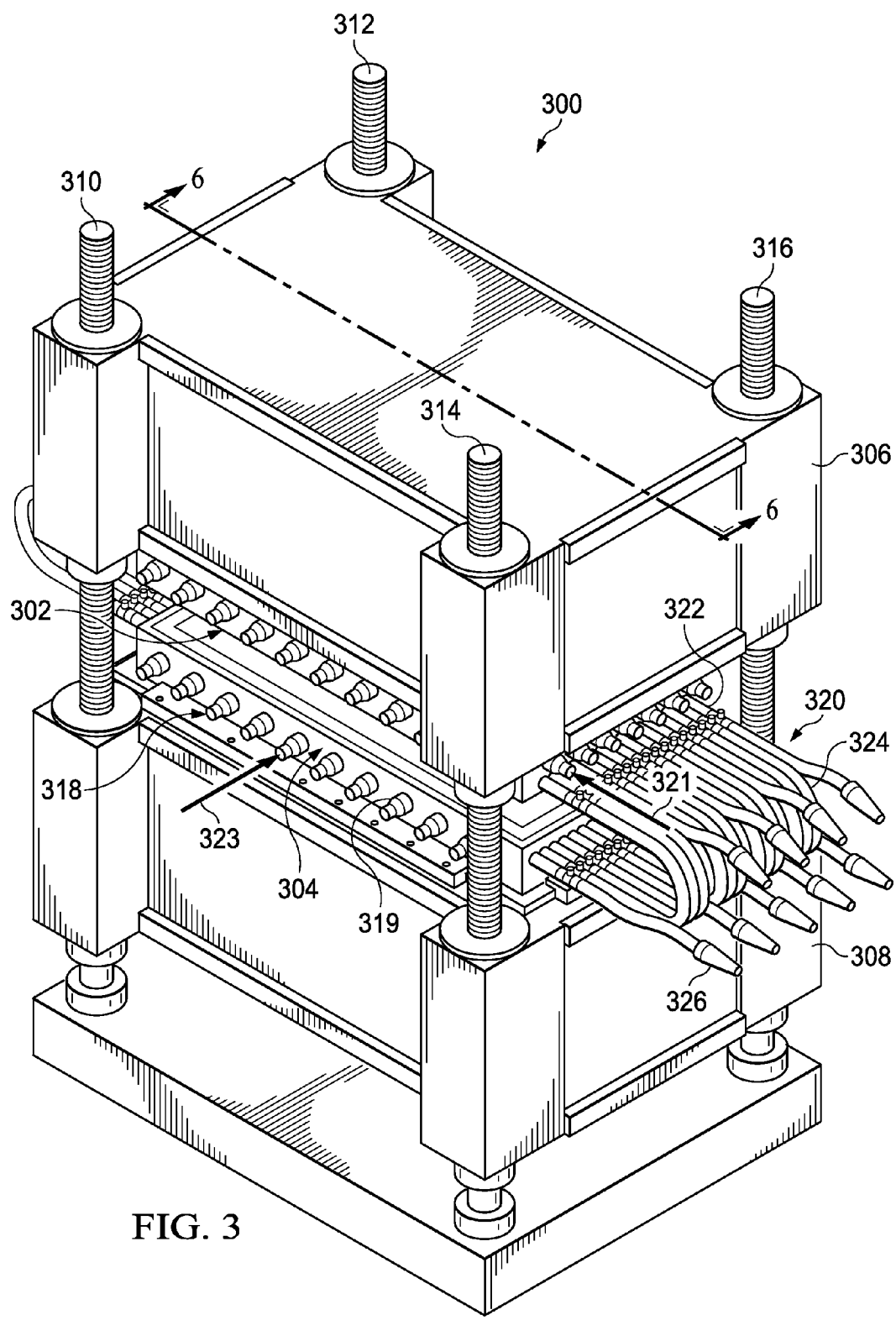
FIG. 3 is an illustration of a perspective view of a tool in accordance with an illustrative embodiment.

Turning now to FIG. 3, an illustration of a perspective view of a tool is depicted in accordance with an illustrative embodiment. In this depicted example, tool 300 is an example of a physical implementation for tool 202 and components in tool 202 in FIG. 2.

In this illustrative example, tool 300 includes first die 302 and second die 304. First die 302 and second die 304 may be a physical implementation of plurality of dies 218 of FIG. 2. As depicted, first die 302 is mounted within load constraint 306. As depicted, second die 304 is mounted within load constraint 308. Load constraint 306 and load constraint 308 may be a physical implementation of plurality of load constraints 217 of FIG. 2. First die 302 and second die 304 may be attached to load constraint 306 and load constraint 308, respectively, by any suitable fastening device such as bolting or clamping.

As depicted, load constraint 306 and load constraint 308 are mounted on column support 310, column support 312, column support 314, and column support 316. Column support 310, column support 312, column support 314, and column support 316 may be a physical implementation of plurality of supports 251 of FIG. 2. Load constraint 306 and load constraint 308 provide backing surfaces for first die 302 and second die 304. Load constraint 306 and load constraint 308 may prevent first die 302 and second die 304 from deforming undesirably such as bending and cracking during manufacturing operations. Load constraint 306 and load constraint 308 may be formed from steel, aluminum, or any other desirable material. Material for load constraint 306 and load constraint 308 may be selected based on the loads present during forming or consolidation. Material for load constraint 306 and load constraint 308 may be selected to provide desirable characteristics such as desirable rigidity and desirable strength to prevent first die 302 and second die 304 from bending and cracking during manufacturing operations. In some illustrative examples, the material may be nonmagnetic to reduce any distortion to the magnetic field produced by plurality of induction coils 320. In some illustrative examples, load constraint 306 and load constraint 308 may not be present. In these illustrative examples, first die 302 and second die 304 may be strong enough to prevent bending or cracking of first die 302 and second die 304 without load constraint 306 and load constraint 308.

First die 302 and second die 304 are reinforced with plurality of rods 318 that are held with plurality of bolts 319. Plurality of rods 318 may be a physical implementation of plurality of rods 224 of FIG. 2. Plurality of bolts 319 may be a physical implementation of plurality of bolts 227 of FIG. 2. Plurality of rods 318 extend both longitudinally 321 and transversely 323 in a grid through first die 302 and second die 304.

Plurality of induction coils 320 are associated with first die 302 and second die 304. Plurality of induction coils 320 may be a physical implementation of plurality of induction coils 222 of FIG. 2. Plurality of induction coils 320 comprise sections 322 and flexible sections 324. As depicted, sections 322 extend along the length of first die 302 and second die 304. Sections 322 may be embedded in first die 302 and second die 304. Sections 322 may be a physical implementation of sections 223 of FIG. 2. Flexible sections 324 join sections 322 in first die 302 and second die 304. Flexible sections 324 may be a physical implementation of flexible sections 225 of FIG. 2. Connectors 326 located at the ends of plurality of induction coils 320 may connect plurality of induction coils 320 to a controller, a power source, a coolant supply, or some other external utility. Connectors 326 may be a physical implementation of connectors 252 of FIG. 2.

The illustration of tool 300 in FIG. 3 is not meant to imply physical or architectural limitations to the manner in which an illustrative embodiment may be implemented. Other components in addition to or in place of the ones illustrated may be used. Some components may be unnecessary.

For example, plurality of rods 318 may extend in only one direction within first die 302 and second die 304. As another example, although first die 302 and second die 304 are depicted, tool 300 may instead have three or more dies.

Figure 4:
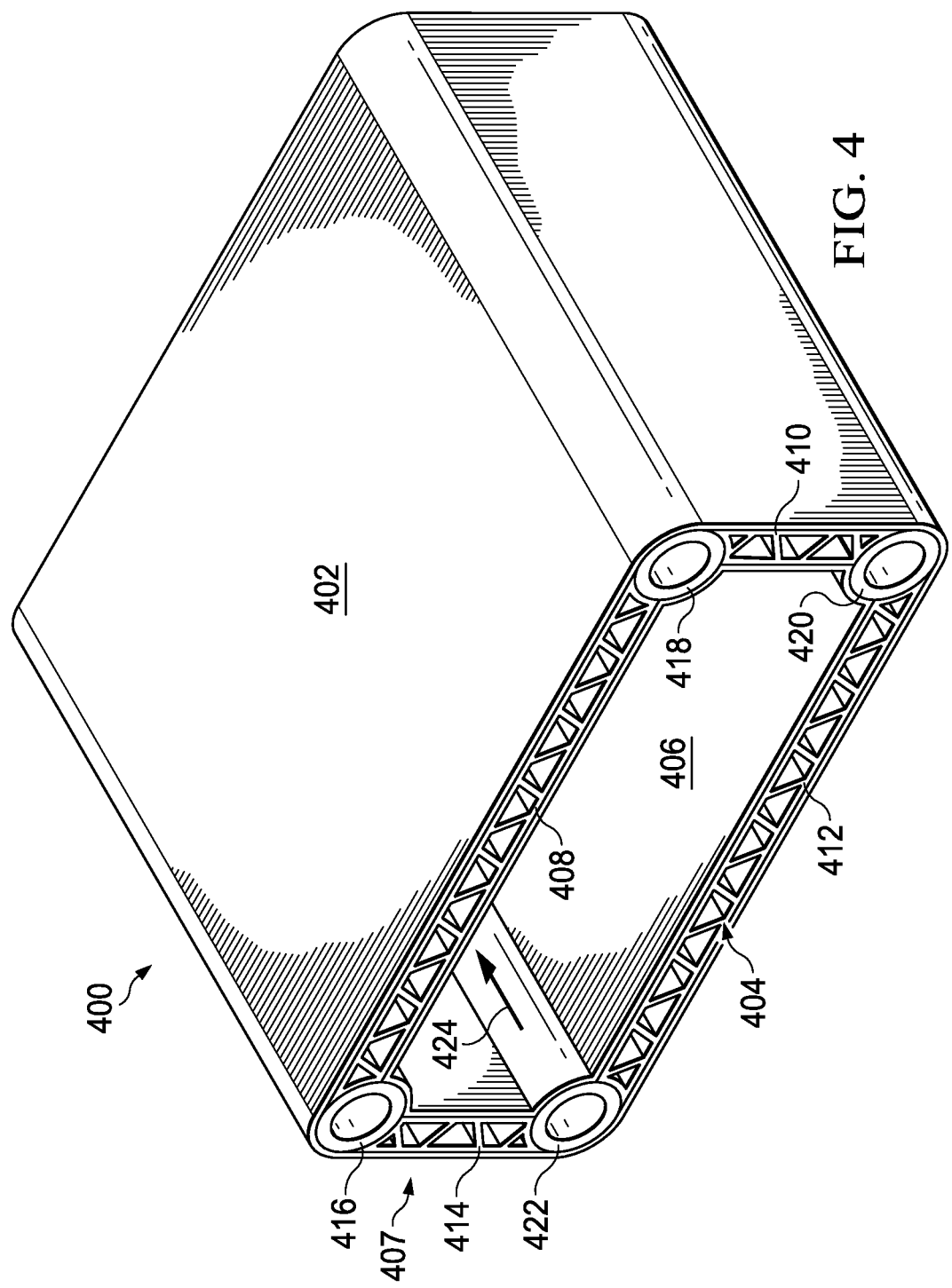
FIG. 4 is an illustration of a structure produced in accordance with an illustrative embodiment.

Turning now to FIG. 4, an illustration of a structure produced in accordance with an illustrative embodiment is depicted. In this depicted example, structure 400 is a physical implementation of structure 206 of FIG. 2. Structure 400 may be produced using tool 300 of FIG. 3. Structure 400 may be a torque box associated with wing 104 of aircraft 100 of FIG. 1.

As depicted, structure 400 has a closed cross-section. Specifically, structure 400 has a rectangular closed cross-section.

Structure 400 has first thermoplastic layer 402, metallic core layer 404, second thermoplastic layer 406, and plurality of thermoplastic parts 407. First thermoplastic layer 402 is associated with a first side of metallic core layer 404. Specifically, first thermoplastic layer 402 is consolidated against and surrounds an exterior surface of metallic core layer 404. First thermoplastic layer 402 also surrounds plurality of thermoplastic parts 407. As depicted, first thermoplastic layer 402 has a closed cross-section. Specifically, as depicted, first thermoplastic layer 402 has a rectangular closed cross-section.

Second thermoplastic layer 406 is associated with a second side of metallic core layer 404. Specifically, second thermoplastic layer 406 is consolidated against an interior surface of metallic core layer 404. Second thermoplastic layer 406 is also associated with plurality of thermoplastic parts 407.

Metallic core layer 404 has metallic core panel 408, metallic core panel 410, metallic core panel 412, and metallic core panel 414 joined by plurality of thermoplastic parts 407. Plurality of thermoplastic parts 407 comprises thermoplastic part 416, thermoplastic part 418, thermoplastic part 420, and thermoplastic part 422.

Figures 5, 6:
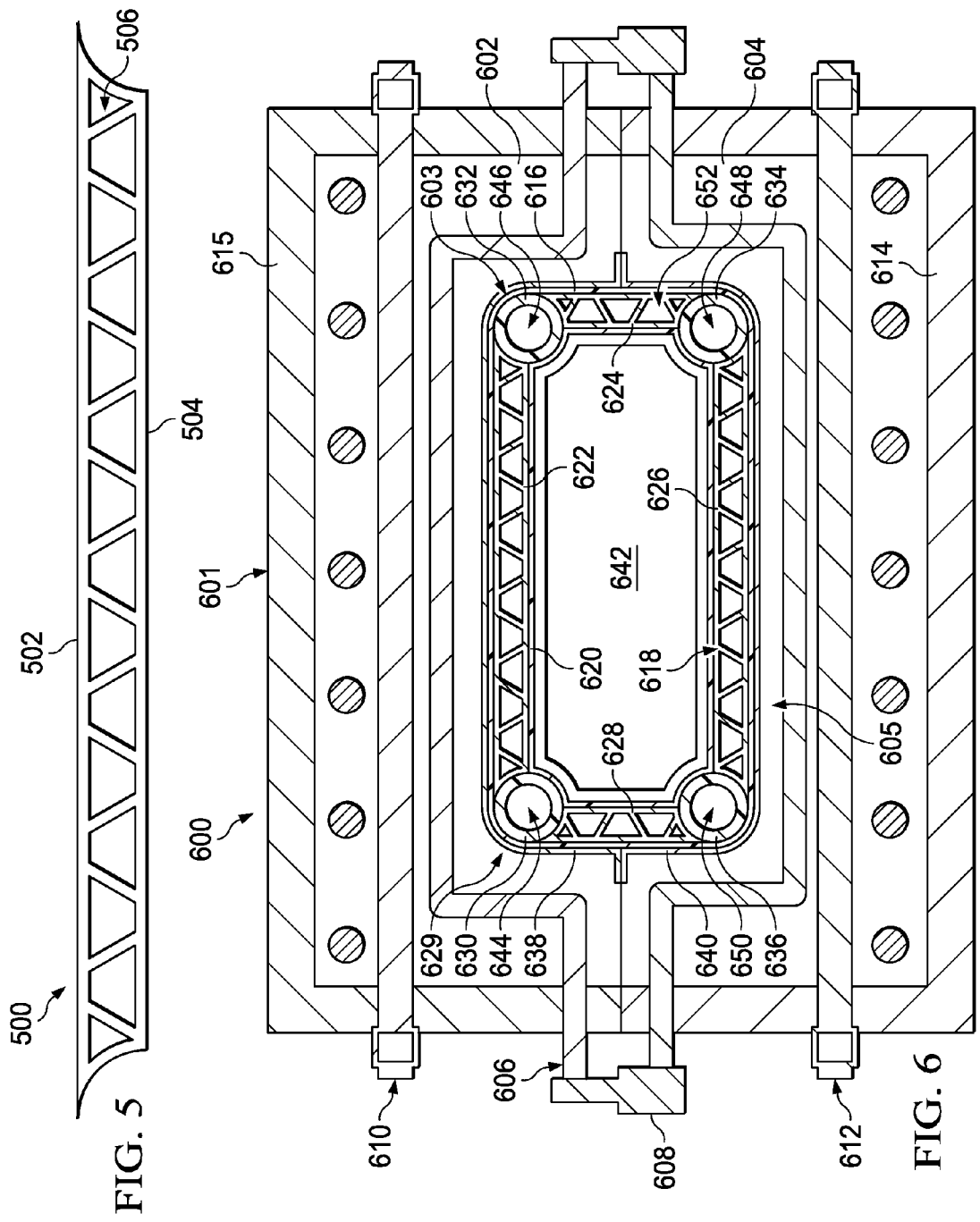
FIG. 5 is an illustration of a metallic core panel in accordance with an illustrative embodiment.
FIG. 6 is an illustration of a cross-sectional view of a structure within a tool in accordance with an illustrative embodiment.

Turning now to FIG. 5, an illustration of a metallic core panel is depicted in accordance with an illustrative embodiment. Metallic core panel 500 may be a physical implementation of a metallic core panel in plurality of metallic core panels 244 of FIG. 2. FIG. 5 is a view of a metallic core panel from direction 424 of FIG. 4. Metallic core panel 500 may be a component of structure 400, such as metallic core panel 408 of structure 400 of FIG. 4.

Metallic core panel 500 has first side 502, second side 504, and plurality of cavities 506. Metallic core panel 500 may extend into the page. Metallic core panel 500 may be formed using an induction heating tool such as tool 202 of FIG. 2.

Although plurality of cavities 506 are depicted as substantially trapezoidal, plurality of cavities 506 may be formed in any desirable shape or arrangement. As depicted, plurality of cavities 506 extends into FIG. 6. Plurality of cavities 506 run substantially parallel to first side 502 and second side 504. In other words, plurality of cavities 506 run longitudinally within metallic core panel 500. Further, although metallic core panel 500 is depicted as being substantially planar, metallic core panel 500 may be formed in any shape including planar, substantially planar, concave, convex, or any other desirable shape.

FIG. 6 is an illustration of a cross-sectional view of a structure within a tool in accordance with an illustrative embodiment. View 600 may be a cross-sectional view of a structure within tool 300 of FIG. 3. Specifically, view 600 is a cross-sectional view of a structure within tool 300 taken along lines 6-6 and from direction 323 in FIG. 3. Tool 601 may be a physical implementation of tool 202 in FIG. 2. Structure 603 may be a physical implementation of structure 206 in FIG. 2.

As depicted, structure 603 is positioned within tool 601. Specifically, structure 603 is positioned between first die 602 and second die 604 within die cavity 605 of tool 601. Structure 603 may extend into the page. First die 602 and second die 604 may be a physical implementation of plurality of dies 218 of FIG. 2. Plurality of induction coils 606 comprises sections 607 and flexible sections 608. Plurality of induction coils 606 may be a physical implementation of plurality of induction coils 222 of FIG. 2. Sections 607 run through first die 602 and second die 604. Sections 607 of plurality of induction coils 606 are joined by flexible sections 608. Plurality of rods 610 run through first die 602. Plurality of rods 612 run through second die 604. Plurality of rods 612 may be a physical implementation of plurality of rods 224 in FIG. 2. First die 602 and second die 604 are held within load constraint 614 and load constraint 615.

Die liner 638 is associated with first die 602 within die cavity 605. Die liner 640 is associated with second die 604 in die cavity 605. Die liner 638 and die liner 640 may be a physical implementation of number of die liners 226 of FIG. 2. Die liner 638 and die liner 640 contact structure 603 within die cavity 605.

Structure 603 comprises first thermoplastic layer 616, metallic core layer 618, and second thermoplastic layer 620. Structure 603 may be a physical implementation of structure 206 of FIG. 2. First thermoplastic layer 616 may be formed of a number of layers of composite tape, composite tows, a braided composite or any other suitable composite material. First thermoplastic layer 616 may be formed using a composite layup process. The composite layup process may be selected from one of braiding, tape layup, tow layup, or any other desirable composite layup process. In some illustrative examples, first thermoplastic layer 616 may be placed on metallic core layer 618 through a composite layup process. In one illustrative example, the composite layup process may lay composite material onto metallic core layer 618. First thermoplastic layer 616 may be a physical implementation of first thermoplastic layer 236 of FIG. 2.

In some illustrative examples, first thermoplastic layer 616 may be placed on metallic core layer 618 as a preform. As used herein, a preform is a composite material formed to a desired shape prior to being placed onto a location. In this illustrative example, first thermoplastic layer 616 may be formed to a desired shape prior to being placed on metallic core layer 618. In some illustrative examples, first thermoplastic layer 616 may be consolidated or semi rigid as first thermoplastic layer 616 is placed on metallic core layer 618.

Second thermoplastic layer 620 may be formed using a composite layup process. The composite layup process may be selected from one of braiding, tape layup, tow layup, or any other desirable composite layup process. In some illustrative examples, second thermoplastic layer 620 may be placed on metallic core layer 618 through a composite layup process. In one illustrative example, the composite layup process may lay composite material onto metallic core layer 618. Second thermoplastic layer 620 may be a physical implementation of second thermoplastic layer 240 of FIG. 2.

In some illustrative examples, second thermoplastic layer 620 may be placed on metallic core layer 618 as a preform. In this illustrative example, second thermoplastic layer 620 may be formed to a desired shape prior to being placed on metallic core layer 618. In some illustrative examples, second thermoplastic layer 620 may be consolidated or semi rigid as second thermoplastic layer 620 is placed on metallic core layer 618.

Metallic core layer 618 has metallic core panel 622, metallic core panel 624, metallic core panel 626, and metallic core panel 628 joined together by plurality of thermoplastic parts 629. Metallic core layer 618 may be a physical implementation of metallic core layer 238 of FIG. 2. Plurality of thermoplastic parts 629 comprises thermoplastic part 630, thermoplastic part 632, thermoplastic part 634, and thermoplastic part 636.

Metallic bladder 642 is positioned within structure 603. Metallic bladder 642 may be a physical implementation of number of metallic bladders 208 of FIG. 2. Metallic bladder 642 contacts second thermoplastic layer 620 within structure 603. Metallic bladder 644 is positioned within thermoplastic part 630. Metallic bladder 646 is positioned within thermoplastic part 632. Metallic bladder 648 is positioned within thermoplastic part 634. Metallic bladder 650 is positioned within thermoplastic part 636. Plurality of thermoplastic parts 629 may be a physical implementation of plurality of thermoplastic parts 242 of FIG. 2. Metallic bladder 644, metallic bladder 646, metallic bladder 648, and metallic bladder 650 may be a physical implementation of number of metallic bladders 208 of FIG. 2.

As depicted, plurality of thermoplastic parts 629 is associated with, metallic bladder 644, metallic bladder 646, and metallic bladder 648, and metallic bladder 650. However, in some illustrative examples, plurality of thermoplastic parts 629 may instead be associated with different forming tools than metallic bladders. In these illustrative examples, forming tools may be selected from soluble mandrels, non-soluble mandrels, metal tooling, or other suitable tools. In one illustrative example, solid metal mandrels may be positioned within thermoplastic part 630, thermoplastic part 632, thermoplastic part 634, and thermoplastic part 636. In this illustrative example, the solid metal mandrels may substantially maintain the shape of plurality of thermoplastic parts 629 and provide resistance to compressive forces during consolidation.

To consolidate structure 603, power may be supplied to plurality of induction coils 606 to produce a magnetic field. In response to the magnetic field, die liner 638 and die liner 640 may generate heat.

Metallic bladder 642, metallic bladder 644, metallic bladder 646, metallic bladder 648, and metallic bladder 650 may be pressurized. Metallic bladder 642, metallic bladder 644, metallic bladder 646, metallic bladder 648, and metallic bladder 650 may be pressurized to the same pressure. When pressurized, metallic bladder 642, metallic bladder 644, metallic bladder 646, metallic bladder 648, and metallic bladder 650 may impart a compressive force to structure 603. Metallic bladder 642 may impart a compressive force to structure 603 by expanding under pressure to press structure 603 against die liner 638 and die liner 640. Metallic bladder 644, metallic bladder 646, metallic bladder 648, and metallic bladder 650 may impart a compressive force to structure 603 by expanding. First die 602 and second die 604 define an outer mold line for structure 603. When metallic bladder 642, metallic bladder 644, metallic bladder 646, metallic bladder 648, and metallic bladder 650 are pressurized, first die 602 and second die 604 provide resistant pressure. In other words, first die 602 and second die 604 may provide a substantially rigid outer mold line for structure 603.

As die liner 638 and die liner 640 generate heat, the temperature of structure 603 increases. As the temperature of structure 603 increases, inert gases in plurality of cavities 652 of metallic core layer 618 increase in volume. As inert gases increase in volume, the pressure within metallic core layer 618 increases. The pressure within metallic core layer 618 may prevent or reduce undesirable changes to the shape of metallic core layer 618 during consolidation. In other words, pressure applied by metallic bladder 642, metallic bladder 644, metallic bladder 646, metallic bladder 648, and metallic bladder 650 may not crush or undesirably impact the shape of metallic core layer 618 due to the pressure within metallic core layer 618. In some illustrative examples, pressure within metallic bladder 642 is substantially the same as pressure inside metallic core layer 618.

As structure 603 is heated and compressed, first thermoplastic layer 616 is consolidated against metallic core layer 618. During heating and compression, resin of first thermoplastic layer 616 flows against metallic core layer 618. As structure 603 is cooled, first thermoplastic layer 616 may solidify against metallic core layer 618.

As structure 603 is heated and compressed, second thermoplastic layer 620 is consolidated against metallic core layer 618. During heating and compression, resin of second thermoplastic layer 620 flows against metallic core layer 618. As structure 603 is cooled, second thermoplastic layer 620 may solidify against metallic core layer 618.

The different components shown in FIGS. 3-6 may be combined with components in FIG. 2, used with components in FIG. 2, or a combination of the two. Additionally, some of the components in FIGS. 3-6 may be illustrative examples of how components shown in block form in FIG. 2 can be implemented as physical structures.

Figure 7:
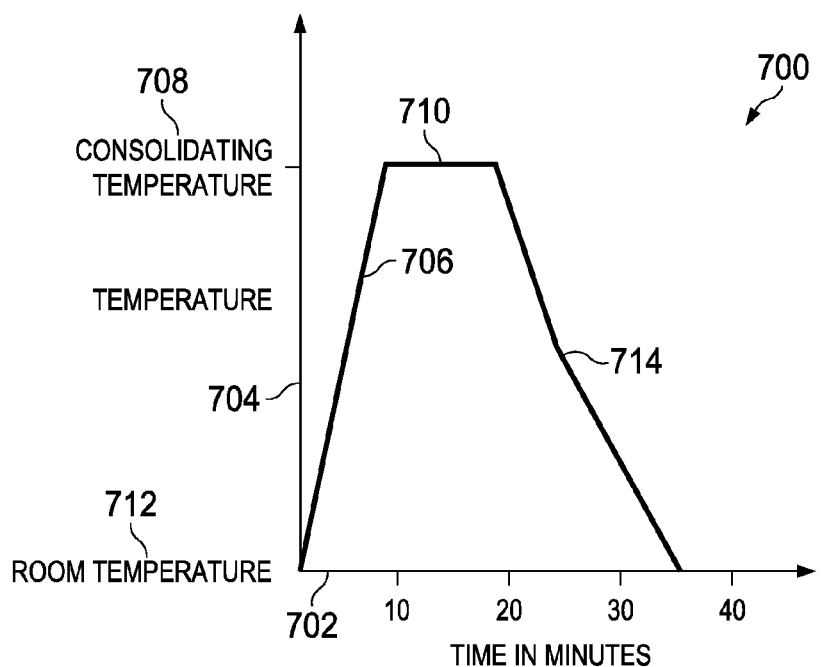
FIG. 7 is an illustration of a temperature cycle in accordance with an illustrative embodiment.

Turning now to FIG. 7, an illustration of a temperature cycle is depicted in accordance with an illustrative embodiment. Temperature cycle 700 may be an illustrative example of a temperature cycle for tool 202 of FIG. 2 in manufacturing structure 206.

Temperature cycle 700 has x axis 702 and y axis 704. Temperature cycle 700 represents the consolidation of a structure comprising a thermoplastic material in a tool. The tool comprises an inductive heating tool.

X axis 702 represents time in minutes. Y axis 704 represents temperature. In temperature cycle 700, the tool takes approximately 10 minutes, as represented by ramp 706, to heat the structure to consolidating temperature 708. Afterwards, consolidating temperature 708 is held for approximately 10 minutes, as represented by hold 710. Following hold 710, the structure is controllably cooled to room temperature 712, as represented by ramp 714.

In some illustrative examples, the structure is cooled in ramp 714 at a rate to produce desirable material characteristics. For example, the structure may be cooled at a rate to produce a desired degree of crystallinity in the thermoplastic material of the structure. In some illustrative examples, the structure is cooled in ramp 714 at a rate to prevent undesirable material characteristics.

As depicted, temperature cycle 700 for consolidation of the structure in the tool is significantly shorter than curing a thermoset material. Further, as depicted, temperature cycle 700 for consolidation of the structure in the tool may take less time than consolidation using a resistive heating tool. Accordingly, by using temperature cycle 700, manufacturing time of sandwich structures may be reduced. Further, by using temperature cycle 700, manufacturing costs may be reduced.

Figure 8:
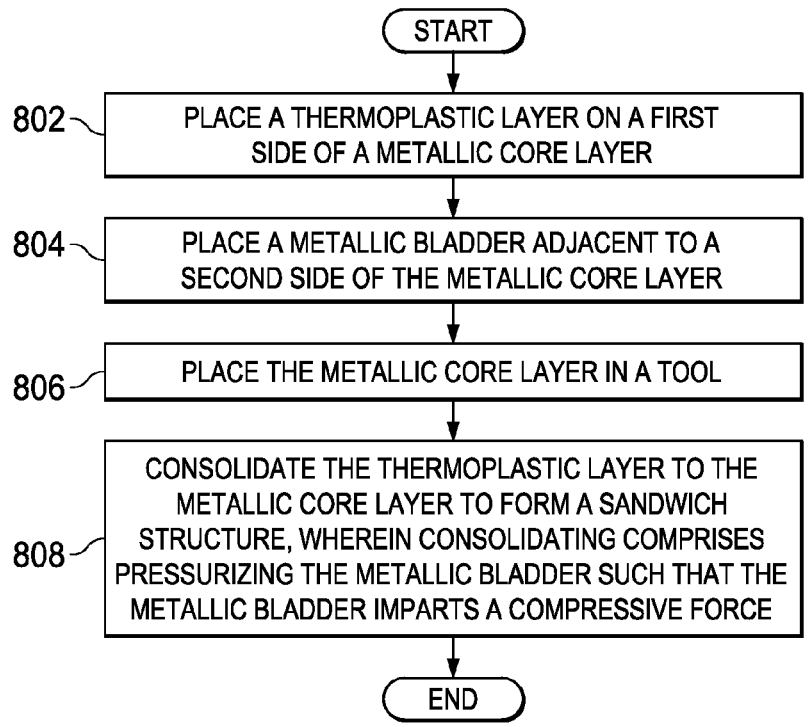
FIG. 8 is an illustration of a flowchart of a process for forming a sandwich structure in accordance with an illustrative embodiment.

Turning now to FIG. 8, an illustration of a flowchart of a process for forming a sandwich structure is depicted in accordance with an illustrative embodiment. The process illustrated in FIG. 8 may be implemented in manufacturing environment 200 of FIG. 2. Further, this process may be implemented to form structure 206 of FIG. 2.

The process may begin by placing a thermoplastic layer on a first side of a metallic core layer (operation 802). The thermoplastic layer may be first thermoplastic layer 236 of FIG. 2. The metallic core layer may be metallic core layer 238 of FIG. 2. The thermoplastic layer may be formed through a composite layup process. In one illustrative example, the composite layup process may lay composite material onto the metallic core layer. In some illustrative examples, the thermoplastic layer may be placed on the metallic core layer as a preform. In one illustrative example, placing the thermoplastic layer comprises laying down a braided thermoplastic material onto the first side of the metallic core layer.

In some illustrative examples, the metallic core layer may have received surface treatment prior to placement of the thermoplastic layer. This surface treatment may be selected from any currently known surface treatment for providing a desired interface between a thermoplastic material to a metallic material during or following consolidation, including chemical treatments, heat treatments, mechanical treatments, or any other suitable treatment.

The process may then place a metallic bladder adjacent to a second side of the metallic core layer (operation 804). The metallic bladder may be number of metallic bladders 208 in FIG. 2. In some illustrative examples, the metallic bladder may be placed within a closed cross-section of the thermoplastic layer.

The process may then place the metallic core layer in a tool (operation 806). The tool may be tool 202 of FIG. 2. In some illustrative examples, the metallic core layer may be placed within a die cavity of a plurality of dies of the tool.

The process may then consolidate the thermoplastic layer to the metallic core layer to form the sandwich structure, wherein consolidating comprises pressurizing the metallic bladder such that the metallic bladder expands and imparts a compressive force to the structure (operation 808). In some illustrative examples, consolidating may also comprise heating the thermoplastic layer using the tool. In some illustrative examples, pressure within the metallic bladder is substantially the same as pressure inside the metallic core layer. In one illustrative example, consolidating the thermoplastic layer to the metallic core layer further comprises applying a magnetic field to a number of die liners associated with the tool, wherein the number of die liners are configured to generate heat when exposed to a magnetic field. Applying the magnetic field heats the thermoplastic layer to a consolidation temperature. In one illustrative example, consolidating the thermoplastic layer to the metallic core layer further comprises cooling the thermoplastic layer and metallic core layer within the tool. In another illustrative example, consolidating the thermoplastic layer to the metallic core layer further comprises pressurizing a metallic bladder placed in each of the thermoplastic parts, wherein each metallic bladder has substantially the same pressure. Afterwards, the process terminates.

Figure 9:
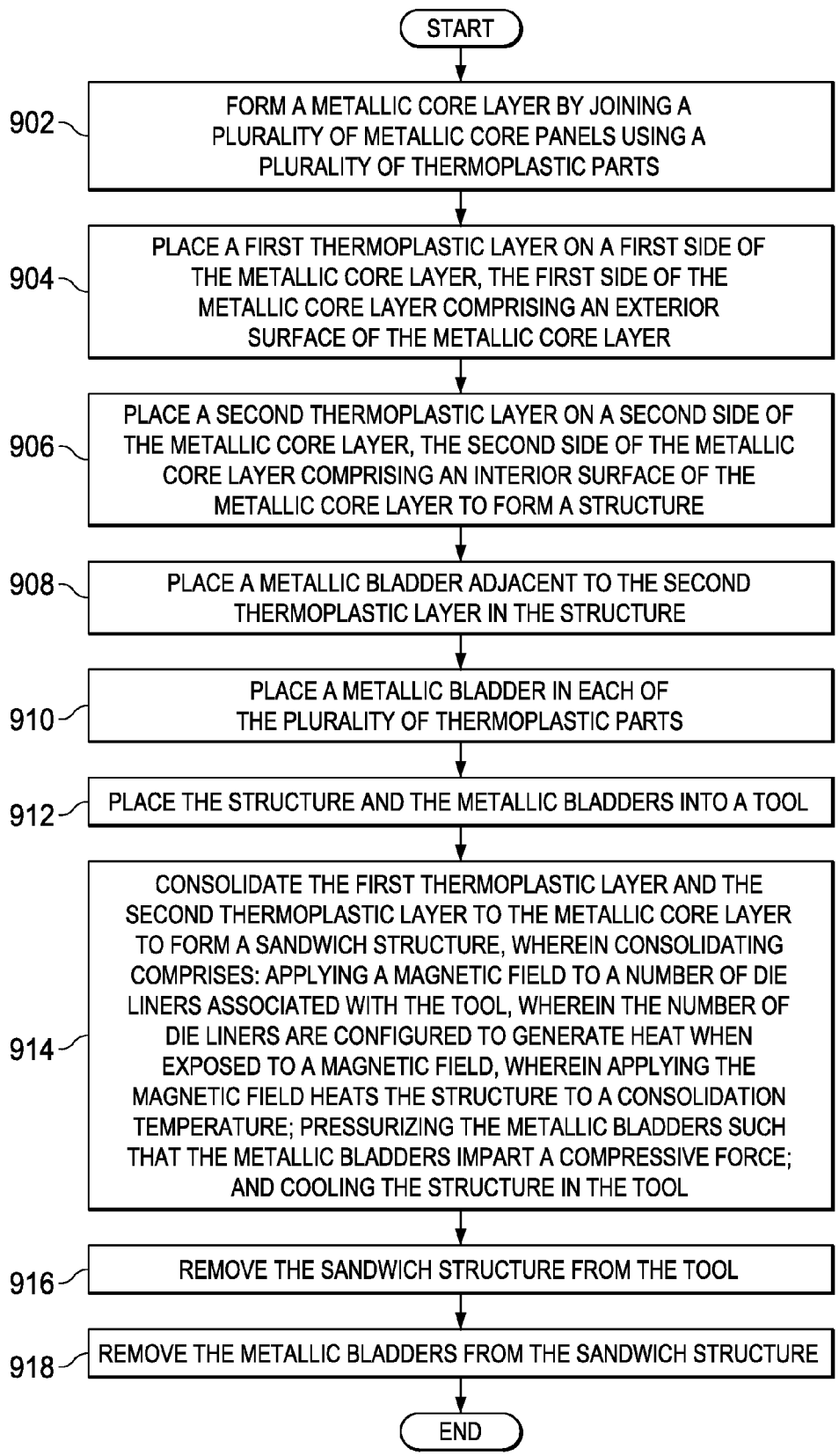
FIG. 9 is another illustration of a flowchart of a process for forming a sandwich structure in accordance with an illustrative embodiment.

Turning now to FIG. 9, another illustration of a flowchart of a process for forming a sandwich structure is depicted in accordance with an illustrative embodiment. The process illustrated in FIG. 9 may be implemented in manufacturing environment 200 of FIG. 2. Further, this process may be implemented to form structure 206 of FIG. 2. The process may begin by forming a metallic core layer by joining a plurality of metallic core panels using a plurality of thermoplastic parts (operation 902). The metallic core layer may be metallic core layer 238 of FIG. 2 comprising plurality of metallic core panels 244. Plurality of thermoplastic parts may be plurality of thermoplastic parts 242 of FIG. 2. The process may then place a first thermoplastic layer on a first side of the metallic core layer, the first side of the metallic core layer comprising an exterior surface of the metallic core layer (operation 904). The first thermoplastic layer may be first thermoplastic layer 236 of FIG. 2 associated with first side 239 of metallic core layer 238. The thermoplastic layer may be formed through a composite layup process. In one illustrative example, the composite layup process may lay composite material onto the metallic core layer. In some illustrative examples, the thermoplastic layer may be placed on the metallic core layer as a preform. In one illustrative example, placing the thermoplastic layer comprises laying down a braided thermoplastic material onto the first side of the metallic core layer.

The process may then place a second thermoplastic layer on a second side of the metallic core layer, the second side of the metallic core layer comprising an interior surface of the metallic core layer to form a structure (operation 906). The second thermoplastic layer may be second thermoplastic layer 240 of FIG. 2 associated with second side 241 of metallic core layer 238. The process may then place a metallic bladder adjacent to the second thermoplastic layer in the structure (operation 908). The metallic bladder may be a metallic bladder in number of metallic bladders 208 of FIG. 2. The metallic bladder may be placed within a closed cross-section of the structure. The closed cross-section may be closed cross-section 233 of structure 206 of FIG. 2.

The process may then place a metallic bladder in each of the plurality of thermoplastic parts (operation 910). The metallic bladders may be metallic bladders in number of metallic bladders 208 of FIG. 2. The process may then place the structure and the metallic bladders into a tool (operation 912). The tool may be tool 202 of FIG. 2. In some illustrative examples, the metallic core layer may be placed within a die cavity of a plurality of dies of the tool.

The process may then consolidate the first thermoplastic layer and the second thermoplastic layer to the metallic core layer to form the sandwich structure, wherein consolidating comprises applying a magnetic field to a number of die liners associated with the tool, wherein the number of die liners are configured to generate heat when exposed to the magnetic field, wherein applying the magnetic field heats the structure to a consolidation temperature; pressurizing the metallic bladders such that the metallic bladders expand and impart a compressive force to the structure; and cooling the structure in the tool (operation 914). The number of die liners may be number of die liners 226 of FIG. 2.

The process may then remove the sandwich structure from the tool (operation 916). Next, the process may remove the metallic bladders from the sandwich structure (operation 918). Afterwards, the process terminates.

Figure 10:
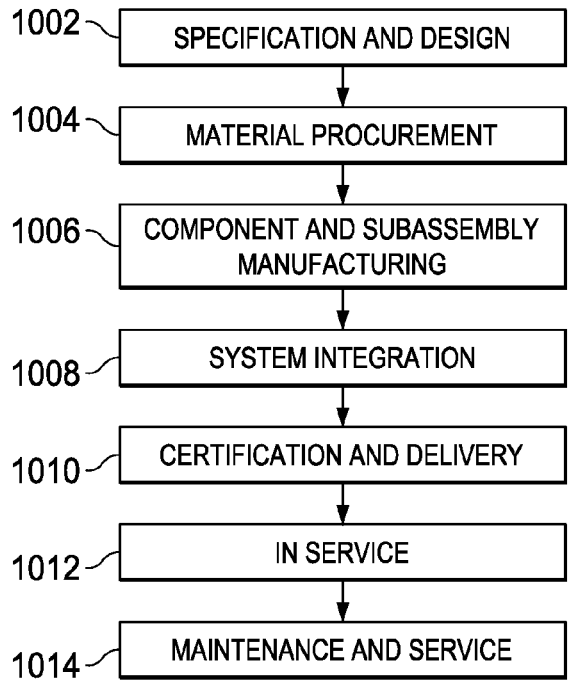
FIG. 10 is an illustration of an aircraft manufacturing and service method in the form of a block diagram in accordance with an illustrative embodiment.
Figure 11:
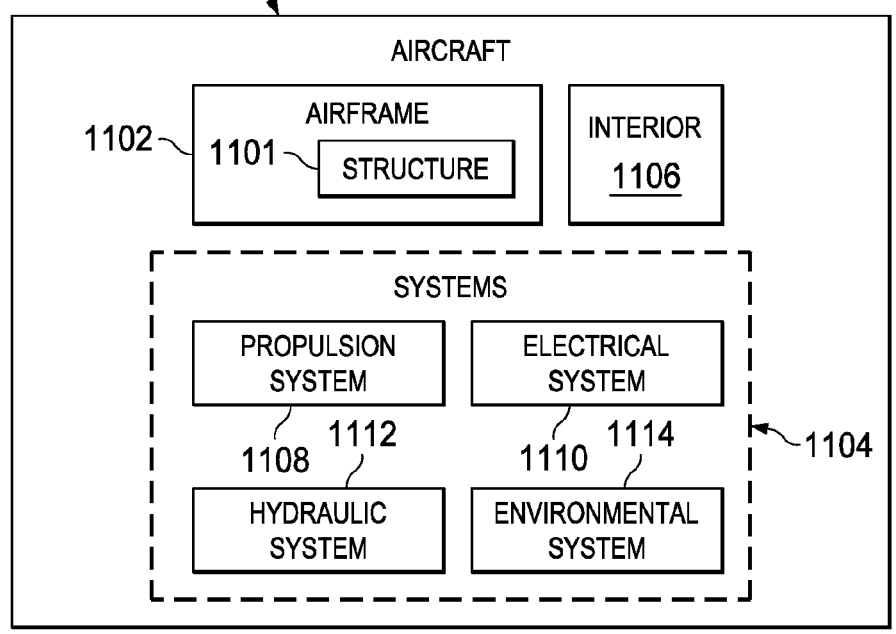
FIG. 11 is an illustration of an aircraft in the form of a block diagram in which an illustrative embodiment may be implemented.

Illustrative embodiments of the disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in the form of a block diagram in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in the form of a block diagram in which an illustrative embodiment may be implemented. In this example, aircraft 1100 is produced by aircraft manufacturing and service method 1000 in FIG. 10 and may include airframe 1102 with plurality of systems 1104 and interior 1106. Airframe 1102 may include structure 1101. Structure 1101 may be an implementation of structure 206 of FIG. 2. In one illustrative example, structure 1101 may take the form of structure 400 of FIG. 4. Examples of systems 1104 include one or more of propulsion system 1108, electrical system 1110, hydraulic system 1112, and environmental system 1111. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10. One or more illustrative embodiments may be used during component and subassembly manufacturing 1006. For example, structure 206 in FIG. 2 may be formed using tool 202 during component and subassembly manufacturing 1006. Further, structure 206 may also be used to perform replacements during maintenance and service 1014. Yet further, material for structure 206, including thermoplastic material for first thermoplastic layer 236 and second thermoplastic layer 240 may be procured during material procurement 1004. Structure 206 may be part of aircraft 1100 such as part of airframe 1102 or systems 1104.

The illustrative embodiments provide a method and apparatus for forming a thermoplastic sandwich structure. Specifically, the illustrative embodiments provide a method and apparatus for forming a thermoplastic and titanium sandwich structure without the use of fasteners. Structure 206 may comprise first thermoplastic layer 236, metallic core layer 238, and second thermoplastic layer 240. By using plurality of induction coils 222 and number of die liners 226 of tool 202, structure 206 may be consolidated. Number of metallic bladders 208 may provide a compression force during consolidation. Inert gases within metallic core layer 238 may provide a pressure substantially the same as the pressure inside the number of metallic bladders.

In some illustrative examples, first thermoplastic layer 236 may comprise a braided composite. In some illustrative examples, second thermoplastic layer 240 may comprise a braided composite.

By forming thermoplastic and titanium sandwich structures according to the illustrative embodiments, manufacturing time may be decreased. By forming thermoplastic and titanium sandwich structures according to illustrative embodiments, manufacturing costs for the sandwich structures may be decreased. Further, the illustrative embodiments may create thermoplastic sandwich structures with lower weights than sandwich structures including fasteners.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a sandwich structure comprising:
joining a plurality of metallic core panels using a plurality of thermoplastic parts, wherein the plurality of thermoplastic parts define at least one vertex of an angle formed by joining the plurality of metallic core panels;
placing a first thermoplastic layer on a first side of a metallic core layer having a plurality of cavities, wherein the metallic core layer comprises the plurality of metallic core panels;
placing a second thermoplastic layer on a second side of the metallic core layer;
placing a metallic bladder adjacent to the second thermoplastic layer on the second side of the metallic core layer, such that the second thermoplastic layer is between the metallic bladder and the second side of the metallic core layer;
placing the metallic core layer in a tool; and
heating the first thermoplastic layer to consolidate the first thermoplastic layer to the first side of the metallic core layer to form the sandwich structure.

2. The method of claim 1, wherein the metallic core panels have a plurality of cavities.

3. The method of claim 2, wherein the plurality of cavities communicate with a group of openings in a surface of the sandwich structure.

4. The method of claim 2, wherein the plurality of cavities extend through the sandwich structure in a longitudinal direction.

5. The method of claim 1, wherein heating the first thermoplastic layer comprises applying a magnetic field to a number of die liners associated with the tool, wherein the number of die liners are configured to generate heat when exposed to the magnetic field, wherein applying the magnetic field heats the first thermoplastic layer to a consolidation temperature.

6. The method of claim 5 further comprising:
cooling the first thermoplastic layer and the metallic core layer within the tool.

7. The method of claim 1, further comprising:
inductively heating the metallic bladder to consolidate the second thermoplastic layer to the second side of the metallic core layer.

8. The method of claim 1, further comprising:
pressurizing the metallic bladder such that the pressure within the metallic bladder is substantially the same as pressure inside the metallic core layer.

9. The method of claim 1, wherein placing the first thermoplastic layer comprises laying down a braided thermoplastic material onto the first side of the metallic core layer.

10. The method of claim 1 further comprising:
placing an additional metallic bladder in each of the plurality of thermoplastic parts; and
pressurizing each additional metallic bladder in each of the plurality of thermoplastic parts, wherein each metallic bladder has substantially a same pressure.

11. The method of claim 1, wherein the sandwich structure is a torque box.

12. The method of claim 1, wherein the metallic core layer has a first side, a second side, and plurality of cavities, and wherein the plurality of cavities extend through the structure in a direction substantially parallel to the first side and the second side.

13. A method of forming a sandwich structure comprising:
- joining a plurality of metallic core panels using a plurality of thermoplastic parts;
- placing a first thermoplastic layer on a first side of a metallic core layer having a plurality of cavities, wherein the metallic core layer comprises the plurality of metallic core panels;
- placing a second thermoplastic layer on a second side of the metallic core layer;
- placing a metallic bladder adjacent to the second thermoplastic layer on the second side of the metallic core layer, such that the second thermoplastic layer is between the metallic bladder and the second side of the metallic core layer;
- placing an additional metallic bladder in each of the plurality of thermoplastic parts; and
- pressurizing each additional metallic bladder in each of the plurality of thermoplastic parts, wherein each metallic bladder has substantially a same pressure;
- placing the metallic core layer in a tool; and
- heating the first thermoplastic layer to consolidate the first thermoplastic layer to the first side of the metallic core layer to form the sandwich structure.

14. The method of claim 13, wherein the metallic core panels have a plurality of cavities.

15. The method of claim 14, wherein the plurality of cavities communicates with a group of openings in a surface of the sandwich structure.

16. The method of claim 14, wherein the plurality of cavities extend through the sandwich structure in a longitudinal direction.

17. The method of claim 14, wherein the metallic core layer has a first side, a second side, and plurality of cavities, and wherein the plurality of cavities extend through the structure in a direction substantially parallel to the first side and the second side.

* * * * *